April 12, 1927.
A. W. HOLMES ET AL
1,624,245
SYSTEM OF FEEDING POULTRY AND LIVE STOCK
Filed Feb. 2, 1926
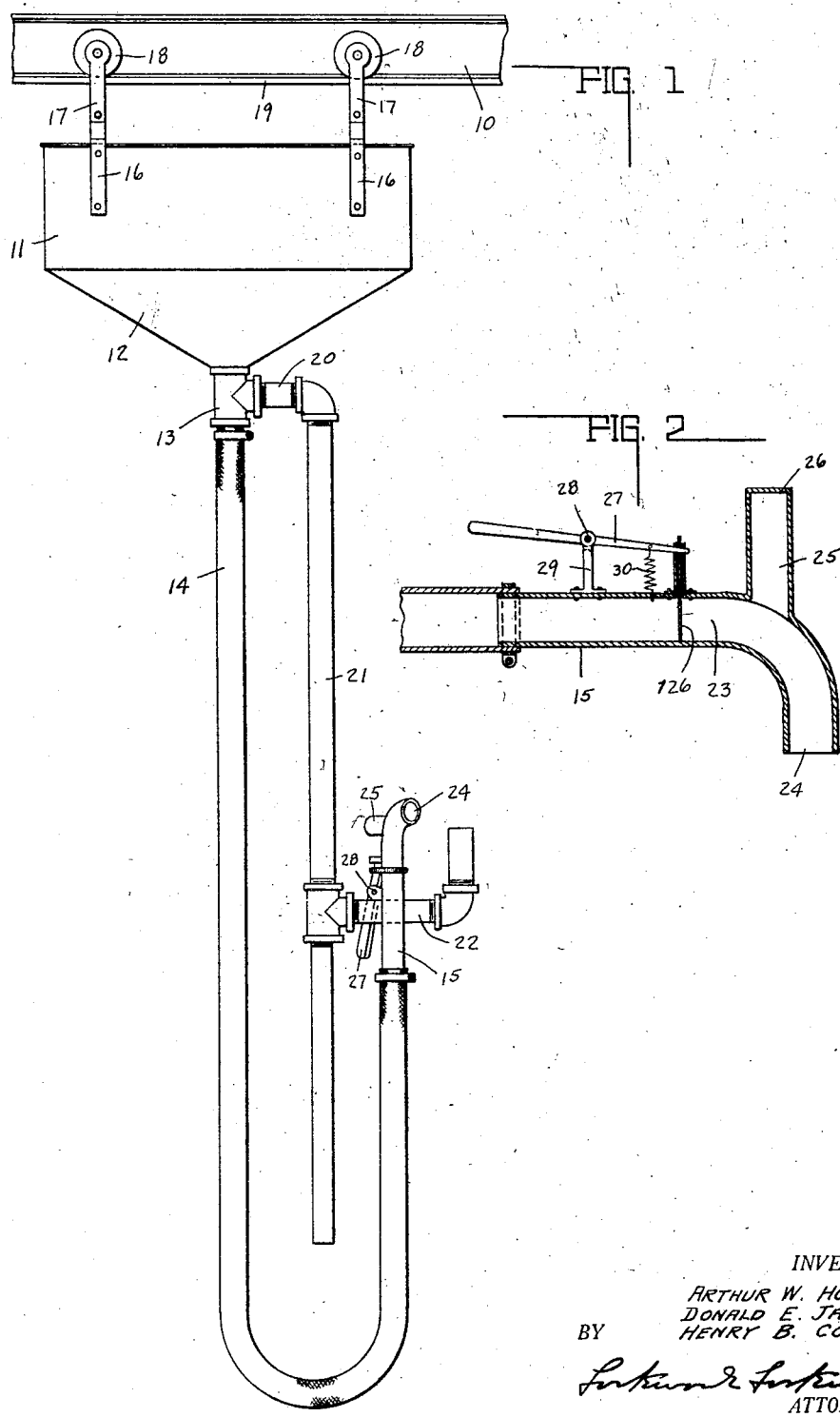
INVENTORS.
ARTHUR W. HOLMES.
DONALD E. JAQUES.
BY  HENRY B. COATS.
ATTORNEYS.

Patented Apr. 12, 1927.

1,624,245

UNITED STATES PATENT OFFICE.

ARTHUR W. HOLMES, OF VEEDERSBURG, DONALD E. JAQUES, OF THORNTOWN, AND HENRY B. COATS, OF VEEDERSBURG, INDIANA.

SYSTEM OF FEEDING POULTRY AND LIVESTOCK.

Application filed February 2, 1926. Serial No. 85,506.

This invention relates to a portable feed supplying device capable of supplying feed to superposed tiers of crates or coops containing fowl.

The chief object of the invention is to provide a device whereby a considerable number of fowl can be most expeditiously supplied with feed, which feed generally is of a liquid character.

One of the chief features of the device consists in the portability thereof and also the adjustability thereof.

Another feature of the invention consists in the discharge control mechanism.

The full nature of the invention will be understood from the accompanying drawings and the following description and claims:

In the drawings Fig. 1 is a side elevational view of a portion of a supporting trackway and the feed containing device with which the supply nozzle is associated. Fig. 2 is an enlarged central view of the supply nozzle and associated parts.

In the drawings 10 indicates a trackway of suitable formation such as an I-beam. Said beam is secured adjacent the several superposed coops or the several stock stalls, etc. so that the tank and associated mechanism can be moved from one to another very quickly. Herein there is shown a tank 11 having a hopper-like bottom 12 which has discharge 13 connected by a flexible conduit 14 to a nozzle construction indicated generally by the numeral 15. The tank 11 is provided with a pair of inverted U-shaped loops 16, each of which is connected to a fork construction 17 that mounts a pair of rollers 18, which rollers ride upon the flanges 19 of the I-beam 10. A pair of the aforesaid carriage constructions movably support the tank upon the beam.

Herein there is shown a lateral extension in the form of a plug 20 suitably connected to a guide bar 21 provided with a lateral bracket portion 22 about breast height. The operator by grasping the guide bar 21 which is rigidly connected to the tank and carriage, can slide the carriage along the beam as desired. The angular portion 22 of this guiding mechanism is adapted to receive the nozzle and support the same in inverted or upended relation.

The nozzle mechanism is shown clearly in Fig. 2, and herein the same comprises a discharge passage 23 having an outlet 24 at right angles thereto. Also at right angles to the discharge passage 23 is a reserve chamber 25 which is so connected thereto that when the nozzle is inverted or upended, the opening from the chamber 25 is at a lower level than the outlet 24. It will be apparent, therefore, that when the nozzle is upended that portion of the liquid trapped within the nozzle and not discharged immediately will reverse its flow and pass into the chamber 25 and be trapped therein. A small vent 26 is provided for relief purposes when the contents of the chamber is discharged through the outlet 24 upon the return positioning of said nozzle.

Herein the nozzle is shown provided with a gate valve 126 operable by a lever 27 pivotally supported at 28 upon a fulcrum stand 29. Connected to the lever is a spring 30 for normally maintaining the valve 126 in closed position.

The invention claimed is:

1. In a stock and poultry feeding device, the combination of an overhead trackway, a depending liquid feed-containing tank adapted to travel thereon, a rigid guide bar extending downward from the tank to render the same accessible for moving the tank on the trackway, a flexible depending discharge tube, and a valve-controlled nozzle on the free end of said tube, whereby the tank is easily moved and at the same time the discharge tube is readily manipulated for discharging the feed.

2. In a stock and poultry feeding device, the combination of an overhead trackway, a depending liquid feed-containing tank adapted to travel thereon, a rigid guide bar extending downward from the tank for moving it on the trackway, a horizontally-disposed arm extending therefrom, a flexible depending discharge tube for distributing the contents of the tank, a valve-controlled nozzle on the end of the tube with a curved discharge outer end, a reserve chamber on the nozzle extending oppositely to the discharge outlet and having a vent therein, a valve in said nozzle, and means on the nozzle for hanging the same on the arm of the guide bar so that the nozzle will extend vertically and the undischarged material therein be held by said reserve chamber, substantially as set forth.

3. A supply nozzle comprising a discharge channel, and a chamber in free communication therewith for discharging through the channel when the nozzle is in discharging position and for receiving the nozzle contents and retaining the same when the nozzle is upended or inverted for preventing drippage.

4. A device of the character defined by claim 3, characterized by a normally closed valve interposed between the inlet and outlet of the nozzle.

In witness whereof, we have hereunto affixed our signatures.

ARTHUR W. HOLMES.
DONALD E. JAQUES.
HENRY B. COATS.